3,748,113
GLASS MELTING APPARATUS
Akira Ito, Tokyo, Japan, assignor to Tokyo Shibaura Electric Co., Ltd., Kawasaki-shi, Japan
Filed Dec. 28, 1971, Ser. No. 213,075
Claims priority, application Japan, Dec. 29, 1970, 46/121,480, 46/121,481, 46/121,482
Int. Cl. C03b *3/00, 5/10*
U.S. Cl. 65—335         3 Claims

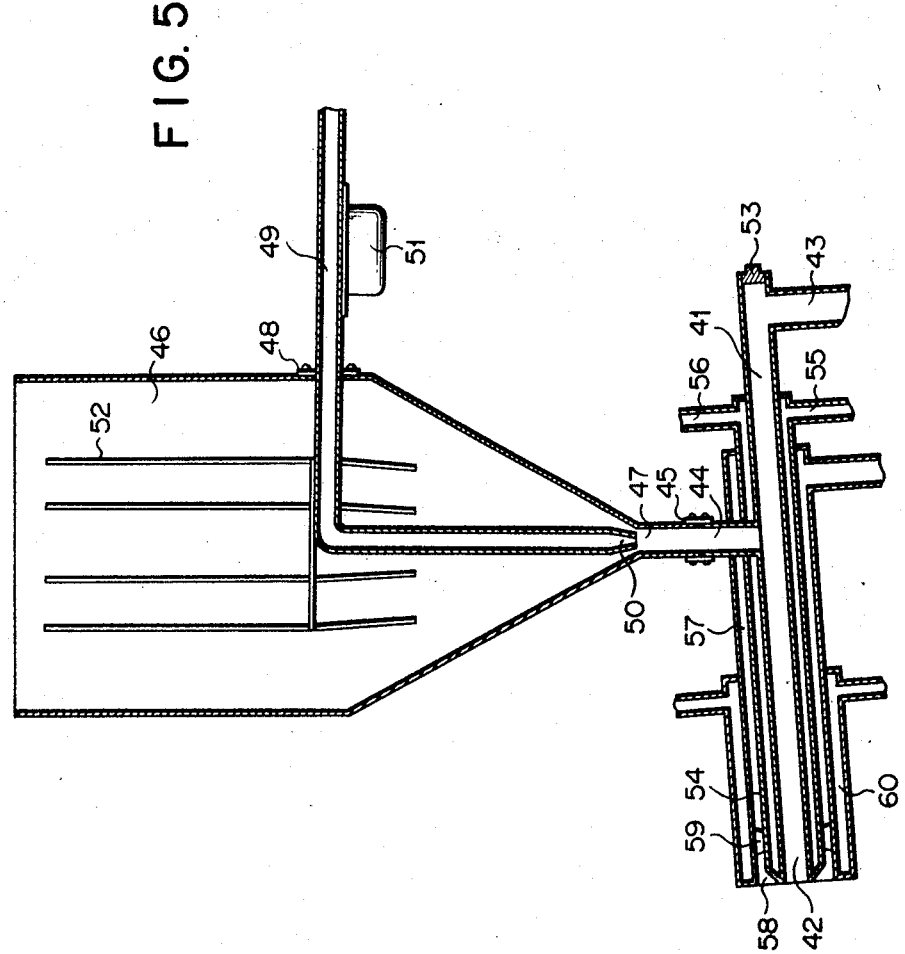

ABSTRACT OF THE DISCLOSURE

A glass melting apparatus comprising a cylindrical member containing a glass melting chamber; a cylindrical flue fitted to the top of said cylindrical member whose lower end projects into the glass melting chamber; a burner for simultaneously ejecting raw glass materials and fuel into the glass melting chamber in the tangential direction of the periphery of that portion of the flue which is disposed in said chamber; and glass purifying means for centrifugally removing air bubbles occluded in the molten glass so as to purify the product glass.

---

This invention relates to a glass melting apparatus capable of melting raw glass materials and purifying the product glass with very high efficiency in terms of heat and time.

For glass melting, there have heretofore been widely accepted the crucible process and a process using a tank furnace resembing an open-hearth type. Glass is generally melted by the following three broadly classified steps. First, blended raw materials are charged into a furnace to be heated, thereby liquefying the low-melting substances of said raw materials such as sodium carbonate, sodium nitrate, potassium carbonate, potassium nitrate, minium, litharge, borax and boric acid. Secondly, these substances are melted by reaction with the difficultly melting substances of said raw materials such as quartz sand, silica powders, dolomite, slaked lime and magnesia. The first stage of the second step at which there are fully liquefied powdered raw materials is commonly known as a batch free process. The latter stage of the second step is referred to as a seed free process whereby there are eliminated extremely fine air bubbles generated in the glass during the first step or other fine air bubbles introduced by chance during the melting of the glass. This seed free process consists in mixing the raw materials in advance with a purifying agent capable of being decomposed and evaporated normally at elevated temperatures such as arsenous acid antimony oxide, Glauber's salt and table salt and removing the aforesaid fine air bubbles by floating them by means of large bubbles occurring at the decomposition of these materials. The third step comprises gradually decreasing the temperature of glass fully melted and freed of air bubbles, stirring the glass by convection taking place at that time and providing sufficiently homogeneous glass for the succeeding molding operation. Of the prior art glass melting apparatuses, one using the crucible process consists in heating raw glass materials in a vessel of refractory material known as a crucible and subjecting them to the aforementioned steps in time sequence. The other using the tank furnace process comprises taking the same steps in a large heating device like a pool by moving the raw materials from one place to another through said device.

It is accordingly an object of this invention to provide a glass melting apparatus capable of melting raw glass materials nd purifying the product with prominently high efficiency.

Another object of the invention is to provide a glass melting apparatus capable of eliminating air bubbles from the molten glass without previously adding a purifying agent to its raw materials.

Still another object of the invention is to provide a glass melting burner capable of melting raw glass materials very effectively and permitting the miniaturization of the glass melting chamber.

These objects are attained by the glass melting apparatus of this invention comprising a glass melting furnace defined by the periphery of a flue forming an inner cylindrical member and the inner walls of a glass melting chamber constituting an outer cylindrical member and provided with a burner penetrating the inner walls of said glass melting chamber so as to simultaneously eject raw glass materials and fuel; and a glass purifying furnace for purifying molten glass flowing out of said melting furnace by centrifugally removing air bubbles therefrom.

The other features and advantages of this invention will be better understood from the following description taken with reference to the accompanying drawings in which:

FIG. 5 is a longitudinal sectional view of a burner constituting part of said apparatus.

There will now be described a melting furnace constituting a component of the glass melting apparatus of this invention.

Figure 2:
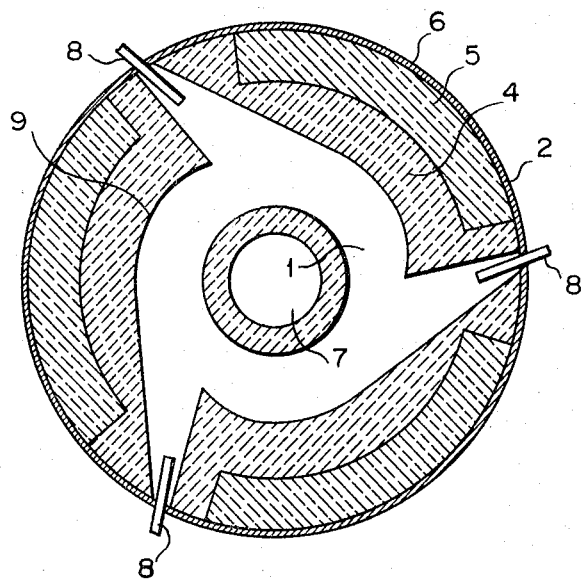
FIG. 2 is a sectional view on line II—II of FIG. 1.
Figure 1:
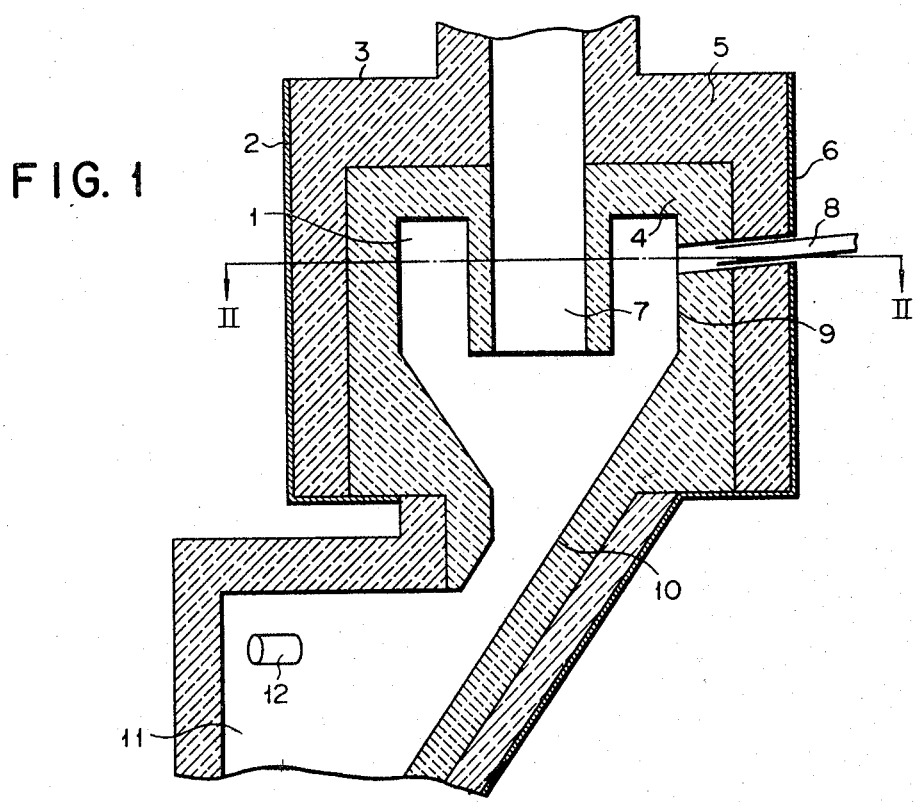
FIG. 1 is a longitudinal sectional view of a glass melting furnace constituting part of a glass melting apparatus according to an embodiment of this invention.

As illustrated in FIGS. 1 and 2, the melting chamber 1 of a glass melting furnace has side walls 2 and a ceiling 3, but no floor. The side walls 2 and ceiling are formed by arranging layers of high refractory bricks 4 and insulating bricks 5 in turn starting with the inner walls thereof. The periphery of the side walls 2 are surrounded by a cylindrical steel casing 6. Numeral 7 denotes a cylindrical flue built of high refractory bricks, the lower end of which penetrates the ceiling 3 of the melting chamber 1 so as to project thereinto and communicates with a heat exchanger (not shown). Numeral 8 represents a burner so constructed as to eject fuel together with raw materials, said burner 8 penetrating the inner wall 9 of the melting chamber 1 to be inserted in the tangential direction of the periphery of the flue 7. The lower portion of the inner wall 9 of the melting chamber 1 constitutes an inclined wall 10 bent at an angle of more than 45° to a horizontal plane and extending to a heating chamber 11 communicably provided at the bottom of the melting chamber 1 so as to constitute part of the inner wall of said heating chamber 11. The walls of the heating chamber 11 are built of the same refractory and insulating bricks as those of the melting chamber 1. Into the heating chamber 11 is inserted a heating burner 12 penetrating its side walls.

There will now be described the operation of the glass melting furnace. Powdered raw glass materials ejected through the burner 8 into the melting chamber 1 together with flames form fluid layers on its inner walls 9 by striking against them in a semimolten state. The raw glass materials which were not fully rendered molten in the flames are quickly liquefied upon contact with said molten fluid layers on the inner walls 9 of the melting chamber 1. Said inner walls 9 are successively supplied with molten fluid layers by the burner 12, which react with each other for further vitrification while running down said inner walls 9 and inclined wall 10 and move to the heating chamber 11. The molting glass brought down to the heating chamber 11 is further heated and falls into a purifying furnace (not shown) below where it is defrothed for purification. Combustion exhaust generated in the melting chamber 1 and heating chamber 11 is conducted to a heat-exchanging device, for example, a heating-exchanging chamber and regenerating or heat accumulating chamber (not shown) through the flue 7 penetrating the ceiling of the melting chamber 1 in order to recover the heat retained by said combustion exhaust. The heat thus recovered is used to preheat combustion air supplied to the burners 8 and 12.

Figure 3:
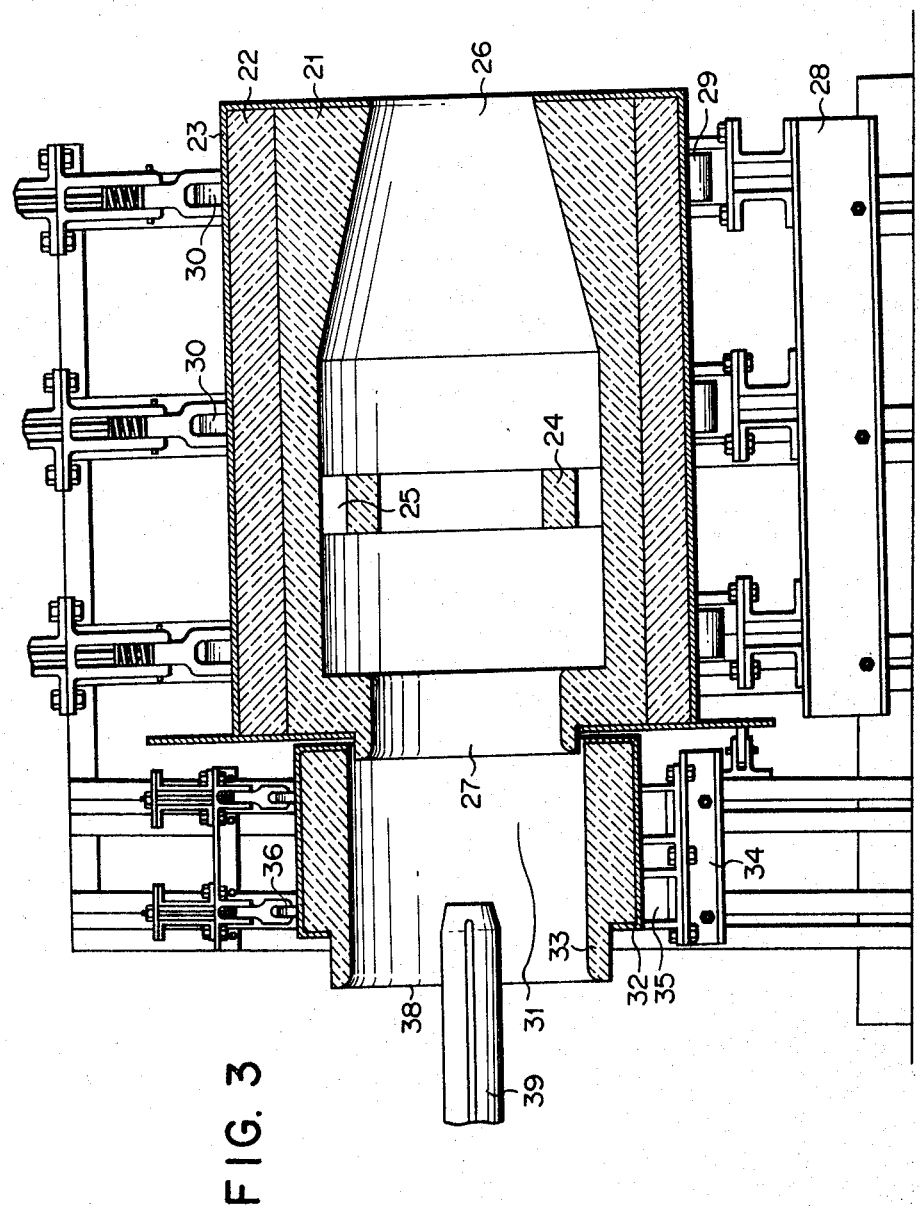
FIG. 3 is a longitudinal sectional view of a glass purifying furnace constituting part of said apparatus.
Figure 4:
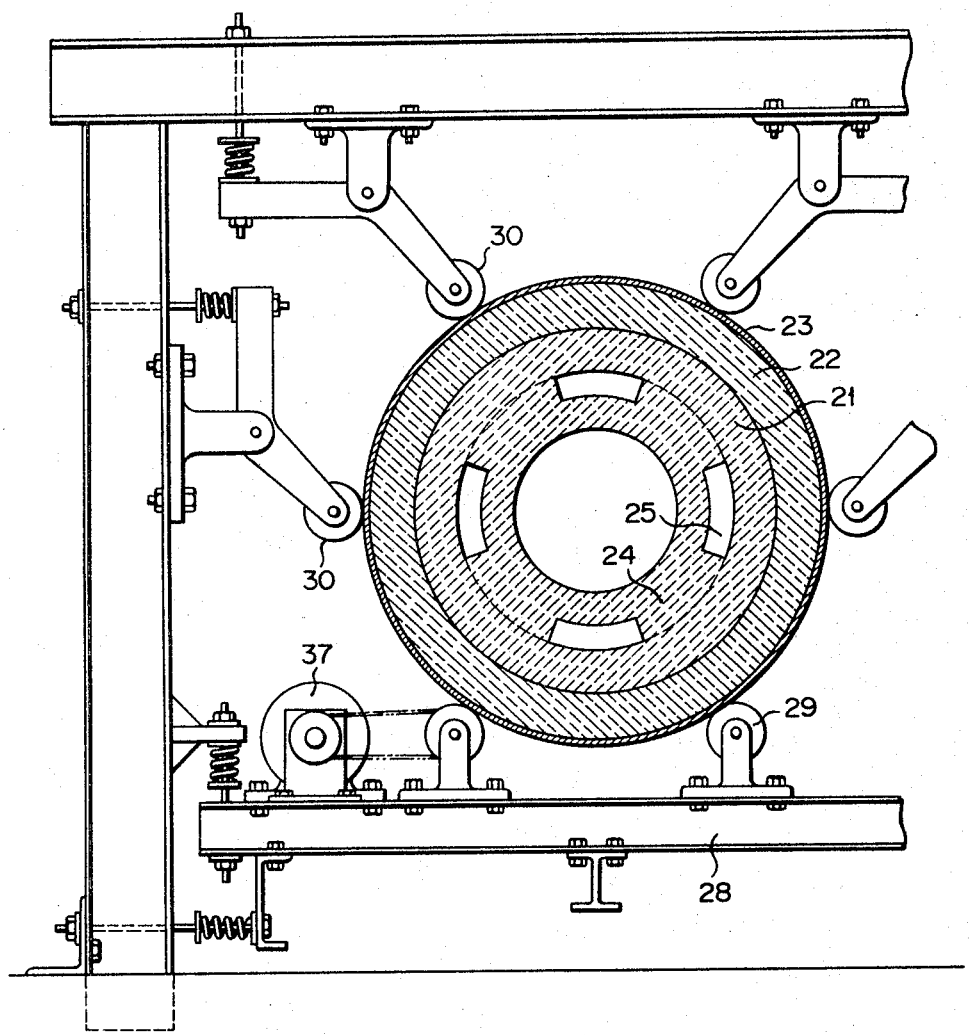
FIG. 4 is a sectional view of FIG 3.

There will now be described a glass purifying furnace constituting part of the glass melting apparatus. As shown in FIGS. 3 and 4, this glass purifying furnace is a rotatable cylindrical member having its inner walls formed of refractory bricks 21 and its outer walls built of insulating bricks 22 and surrounded by a metal casing 23 on the outermost side. Numeral 24 is an annular partition wall made of refractory material, which is tightly fixed to the inner walls of the purifying furnace substantially at right angles to the rotation axis of said rotatable cylindrical member. The partition wall 24 has its peripheral edge perforated with a plurality of through holes 25 allowing the passage of defrothed molten glass. The rotation axis of the glass purifying furnace constructed as described above is inclined at an angle of several to ten and add degrees to the horizontal plane, said glass purifying furnace being mounted on a support rollers 29 fitted to the upper surface of a steel base 28 with a molten glass inlet 26 disposed at a higher level and a molten glass outlet 27 positioned at a lower level. Further, the glass purifying furnace is supported by a large number of press rollers 30 from the periphery of the casing 23. Numeral 31 is a cylindrical mixing rotor having refractory lining 33 provided on the inner wall of its casing 32, said rotor 31 being disposed adjacent to the molten glass outlet 27 so as to rotate with the same axis as the rotatable cylindrical member. This rotor 31 is mounted on rollers 35 fitted to the upper surface of a support base 34 and further supported by a large number of auxiliary rollers 36 from the periphery of its casing 32, and can rotate about its own axis independently of the rotatable cylindrical member.

There will now be described the number of rotations of the rotatable cylindrical member and mixing rotor 31. The rotatable cylindrical member turns at the rate of 60 to 100 r.p.m. by driven means 37 shown in FIG. 4 and the mixing rotor 31 at the rate of 5 to 20 r.p.m. by drive means (not shown), both in the same direction. Numeral 38 represents a molten glass outlet formed at the lower part of the peripheral wall of the mixing rotor 31 and numeral 39 a burner insereted into the mixing rotor 31 through said outlet 38 so as to maintain the interior of the glass purifying furnace at a fully high temperature.

There will be described the operation of said glass purifying furnace. The molten glass brought into the rotatable cylindrical member through the inlet 26 impinge on the inner walls of said furnace built of the refractory bricks 21 by the centrifugal force of the rotatable cylindrical member, thereby forcing out air bubbles occluded in the molten glass in the direction of the rotation axis of said cylindrical member. The molten glass deformed for purification by impinging on the inner walls of the rotatable cylindrical member passes through the holes perforated in the annular partition wall 24 and then is conducted to the mixing rotor 31 through the outlet 27. The molten glass running into the mixing rotor 31 is ejected over its entire inner walls by the centrifugal force of the rotatable cylindrical member. However, the mixing rotor 31 rotates more slowly than said cylindrical member, so that the molten glass is soon released from the centrifugal force and is collected at the bottom of the mixing rotor 31 by running down its inner walls. Since said rotor 31 turns at a low speed, the various portions of the molten glass are well mixed with each other, obtaining fully homogeneous product. The molten glass thus purified is supplied to the succeding molding process (not shown) from the molten glass outlet 38 of the mixing rotor 31. Because the glass purifying furnace should be operated at fully high temperature, the burner 39 is kept burning during said operation.

There will now be described by reference to FIG. 5 the burner 39 which simultaneously ejects raw glass material and fuel into the glass melting furnace. Numeral 41 is an air pipe which is provided at one end with an jection port 42, in the opposite end wall with a hot air inlet 43 and at the intermedaite part with a raw material feed pipe 44 communicating with said air pipe 41. The raw material feed 44 is connected at one end to the delivery port 47 of a raw glass material hopper 46 through a connector 45. Into said hopper 46 is inserted a high compressed air pipe 49 through the peripheral wall, using a packing 48. The inner end of said high compressed air pipe 49 constitutes an air ejection port 50 in the raw material delivery port 47 of the hopper 46. That portion of the high compressed air pipe 49 which is exposed outside of the hopper 46 is fitted with a vibrator 51 and that portion of said high compressed air pipe 49 which is received in the hopper 46 is fitted with an assembly 52 of vibration transmitting bars which is shaken by the vibrator 51. The outer end of the other air pipe 41 is normally closed with a detachable plug 53. Where required, however, plug 53 is taken off to clean the interior of said air pipe 41.

On the periphery of the air pipe 41 is provided a cooling pipe 54 which coaxially surrounds said air pipe 41 and is sealed at one end by the peripheral edge of the ejection port 42 of said air pipe 41. The temperature of said air pipe 41 is controlled by a cooling medium passing through the cooling pipe 54. Numerals 55 and 56 represent the inlet and outlet of said cooling medium. Numeral 57 shows a fuel pipe which coaxially surrounds said cooling pipe 54 and has a fuel ejection port 58 provided on the same side as the ejection port 42 of the air pipe 41. To the inner wall of that part of the fuel pipe 57 which is disposed near said fuel ejection port 58 is fitted an assembly of guide blades 59 so as to impart a vortex motion to the fuel when it is ejected. The periphery of the outer end of the fuel pipe 57 is surrounded by a water cooled jacket 60 for cooling said fuel pipe 57.

There will now be described the operation of the burner of this invention. When there is jetted high compressed air out of the ejection port 50 of the high compressed air pipe 49, then there occurs a negative pressure in the neighborhood. As the result, the raw materials received in the hopper 46 are drawn out therefrom through the delivery port 47 by a suction force resulting from said negative pressure in a state mixed with the high compressed air and brought into the raw material feed pipe 44 and then into the other air pipe 41.

On the other hand, there is introduced hot air at a pressure of 300 to 1000 mm. water column from the hot air inlet 43 formed in the peripheral wall of the inner end of the air pipe 41 so as to converge with the aforesaid mixture of high compressed air and powered raw materials at the junction of the feed pipe 44 and air pipe 41. The mass is jetted out of the ejection portion 42 of said air pipe 41. From the ejection port 58 of the fuel pipe 57 is emitted fuel in the form of flames. When enveloped in said flames, the powdered raw materials are brought to a molten state. The volume of high compressed air supplied through the high compressed air pipe 49 accounts for 30 to 50 percent of the theoretical amount required for full combustion of the fuel used, and the volume of air introduced through the hot air inlet 43 of the air pipe 41 corresponds to 70 to 100 percent of the theoretical amount required for full combustion of said fuel. The air supplied through the hot air inlet 43 is heated by utilizing the waste heat carried by the combustion exhaust from the burner. While the powdered raw glass materials pass through the air pipe 41, it is necessary to cool said pipe 41 in conformity with those of said raw materials which have the lowest melting point. The temperature to which the air pipe 41 should be cooled preferably ranges from 60° to 350° C. for ordinary raw glass materials. This temperature is controlled by the cooling pipe 54 fitted to the periphery of the air pipe 41. If a cooling medium conducted through the cooling pipe 54 consists of air, there will be obtained a more elevated heat efficiency by passing it through the high compressed air pipe 49 so as to deliver the powdered raw materials of the hopper 46. Where, however, air has too high temperature near the hot air inlet 43 to be used as a cooling medium, then there may be used water instead.

Raw glass materials which are to be stored in the hopper 46 should preferably be crushed to smaller particle sizes than 60 mesh. However, it often happens that of the raw materials thus finely divided, only those present at the center of the hopper 46 are allowed to be delivered, but those disposed near the inner peripheral walls of the hopper 46 are always left out in a state sticking to said walls. According to this invention, therefore, the raw glass material hopper 46 is so constructed as to have high compressed air ejected near its delivery port 47. Thereby substantially eliminating the aforesaid drawback. Where this construction still fails fully to serve the purpose, such difficulties are completely eliminated by fitting the aforementioned assembly of vibration transmitting bars in a state buried in the stored raw glass materials and shaking said assembly the vibrator 51. Where it is desired to cease the delivery of raw glass materials, the object is attained by stopping the ejection of high compressed air and bringing the vibrator 51 to rest. Burner fuels may consist of ordinary industrial fuels such as city gas, LPG, butane, natural gas, oil gas, light oil and heavy oil.

As mentioned above, the glass melting apparatus of this invention consists of a melting furnace capable of simultaneously ejecting raw glass materials and fuel and a purifying furnace for purifying molten glass produced in said melting furnace. In the melting furnace, powdered raw glass materials ejected from the burner are strongly heated by being enveloped in the flames of fuel simultaneously forced out of said burner and quickly brought to a molten state. When striking against the inner walls of the melting chamber, the molten mass forms fluid layers thereon. While running down said inner walls, these layers react with each other to be more vitrified. As compared with the prior art tank or crucible type glass melting furnace, therefore, the glass melting apparatus of this invention can melt raw glass materials with greater heat efficiency and in much shorter time. Further, the conventional tank type glass melting furnace has the drawback that part of the raw glass materials charged into the furnace is often sucked into the flue to plug it. With the glass melting apparatus of this invention, however, powdered raw glass materials ejected into the melting chamber instantly become molten and are attached to the inner walls of the melting chamber, thereby eliminating the occurrence of difficulties encountered with the prior art furnace. Moreover, the glass melting appaartus of this invention is provided with a purifying furnace for centrifugally removing air bubbles from the molten glass, eliminating the necessity of previously mixing, as in the conventional type, any purifying agent and nitrates required therefor with raw glass materials. This decreases the cost of glass and protects the product glass from the deterioration of physical properties which might otherwise arise from addition of such purifying agent.

I claim:

1. A glass melting apparatus comprising a glass melting furnace defined by the periphery of a flue constituting an inner cylindrical member and the inner walls of a glass melting chamber forming an outer cylindrical member; a burner penetrating the inner walls of said glass melting chamber for simultaneously ejecting raw glass materials and fuel into said glass melting chamber in the tangential direction of the periphery of said flue, said burner comprising an air pipe for conducting hot air, a raw glass material feed pipe connected to the side wall of the air pipe so as to cause a mixture of high compressed air and raw glass materials carried thereby the converge with the hot air of the air pipe, a cooling pipe surrounding the air pipe so as to prevent raw glass materials from being fused to the inner walls of the air pipe and a fuel pipe coaxially surrounding said cooling pipe; and a purifying furnace for subjecting molten glass flowing off of said melting furnace to a centrifugal force to eliminate air bubbles occluded therein, said purifying furnace comprising a rotatable cylindrical member and an annular partition wall fitted to the inner walls of said rotatable cylindrical member and having its peripheral edge perforated with through holes permitting the passage of defrothed molten glass.

2. A glass melting apparatus according to claim 1 wherein there is further provided a heating chamber below the glass melting chamber in communical relationship therewith so as to fully heat the molten glass running down from said glass melting chamber.

3. A glass melting apparatus according to claim 1 wherein the glass purifying furnace has a mixing rotor disposed adjacent to the rotatable cylindrical member in coaxial relationship therewith to receive the defrothed molten glass overflowing said rotatable cylindrical member and rotated independently of said cylindrical member, thereby effecting the homogenization of the product glass, and there is inserted into said rotor heating means for maintaining the interior of the glass purifying furnace at prescribed high temperature.

References Cited
UNITED STATES PATENTS

| | | | |
|---|---|---|---|
| 1,889,511 | 11/1932 | Amsler | 65—335 X |
| 2,918,754 | 12/1959 | Plumer | 65—135 X |
| 2,962,838 | 12/1960 | Kebler et al. | 65—335 X |
| 3,077,094 | 2/1963 | Jack et al. | 65—136 |
| 3,510,289 | 5/1970 | Boivent | 65—335 |
| 3,563,722 | 2/1971 | Troyankin et al. | 65—335 |

ROBERT L. LINDSAY, Jr., Primary Examiner

U.S. Cl. X.R.

65—135, 136